(12) United States Patent
Uras

(10) Patent No.: US 6,622,577 B1
(45) Date of Patent: Sep. 23, 2003

(54) SINGLE COIL MAGNETOSTRICTIVE SENSORS

(76) Inventor: Mehmet H. Uras, 3585 Burbank Dr., Ann Arbor, MI (US) 48105

( * ) Notice: Subject to any disclaimer, the term of this patent is extended or adjusted under 35 U.S.C. 154(b) by 0 days.

(21) Appl. No.: 09/166,415

(22) Filed: Oct. 5, 1998

Related U.S. Application Data

(60) Provisional application No. 60/061,292, filed on Oct. 7, 1997.

(51) Int. Cl.[7] ................................. G01F 1/34
(52) U.S. Cl. ................................. 73/862.69
(58) Field of Search ............... 73/862.69, 862.325, 73/204.26, 204.25; 324/209

(56) References Cited

U.S. PATENT DOCUMENTS

| | | | | |
|---|---|---|---|---|
| 5,437,197 A | * | 8/1995 | Uras et al. ............... | 73/862.69 |
| 5,865,463 A | * | 2/1999 | Gagnon et al. ............ | 280/735 |
| 5,902,934 A | * | 5/1999 | Sprague et al. ............ | 73/779 |
| 5,908,987 A | * | 6/1999 | Raj .......................... | 73/514.09 |
| 6,109,117 A | * | 8/2000 | Stanley et al. ......... | 73/862.325 |

* cited by examiner

Primary Examiner—Benjamin R. Fuller
Assistant Examiner—Jewel V. Thompson
(74) Attorney, Agent, or Firm—Harness, Dickey & Pierce, P.L.C.

(57) ABSTRACT

Single coil magnetostrictive force or strain sensors. The single coil sensors have one electrical coil to both excite the magnetostrictive circuit and detect changes in the permeability of the circuit arising from forces applied to the circuit or induced to strain a portion of the circuit, The sensor may be instructed to sense either or both compressive or tensile forces applied to the magnetostrictive circuit. Thin foils or plating applied to non-magnetically permeable materials may comprise part or all of the magnetostrictive circuit to provide an exceptionally inexpensive and light weight structure for the sensor. A permanent magnet may be incorporated into the structure to provide a sensor capable of measuring dynamic force, especially those of impact, explosion and relatively high frequency.

30 Claims, 5 Drawing Sheets

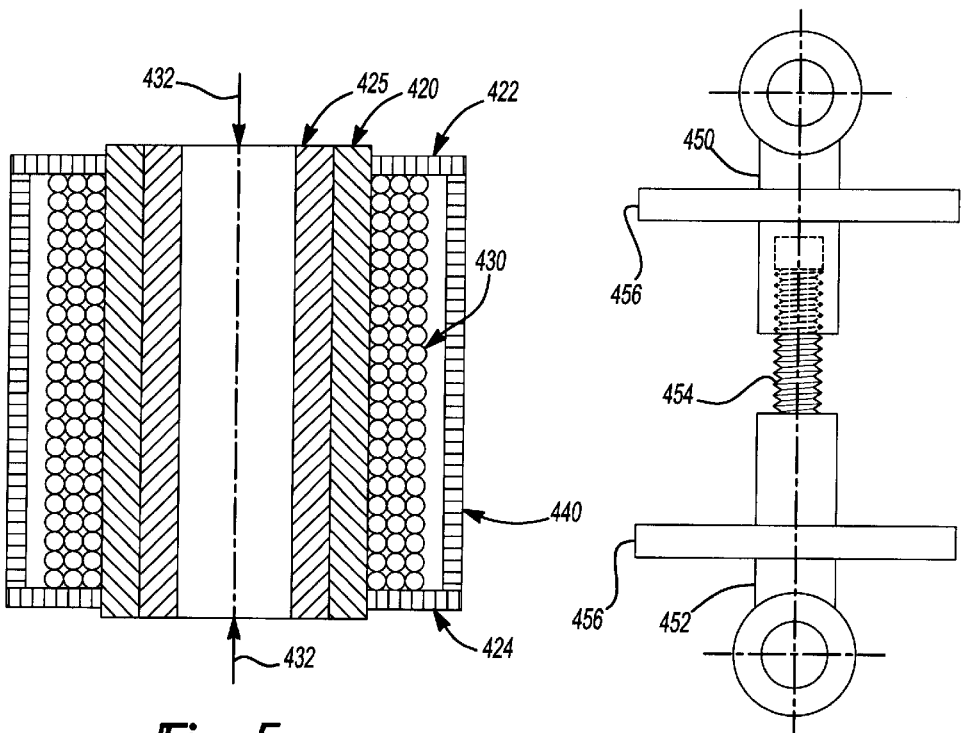
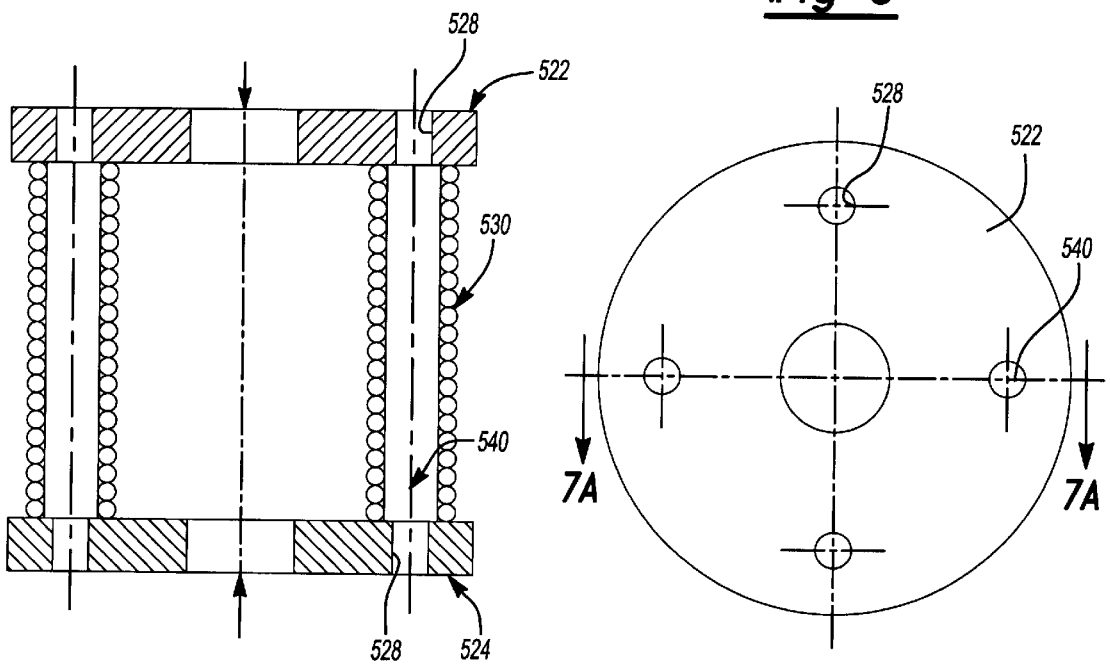

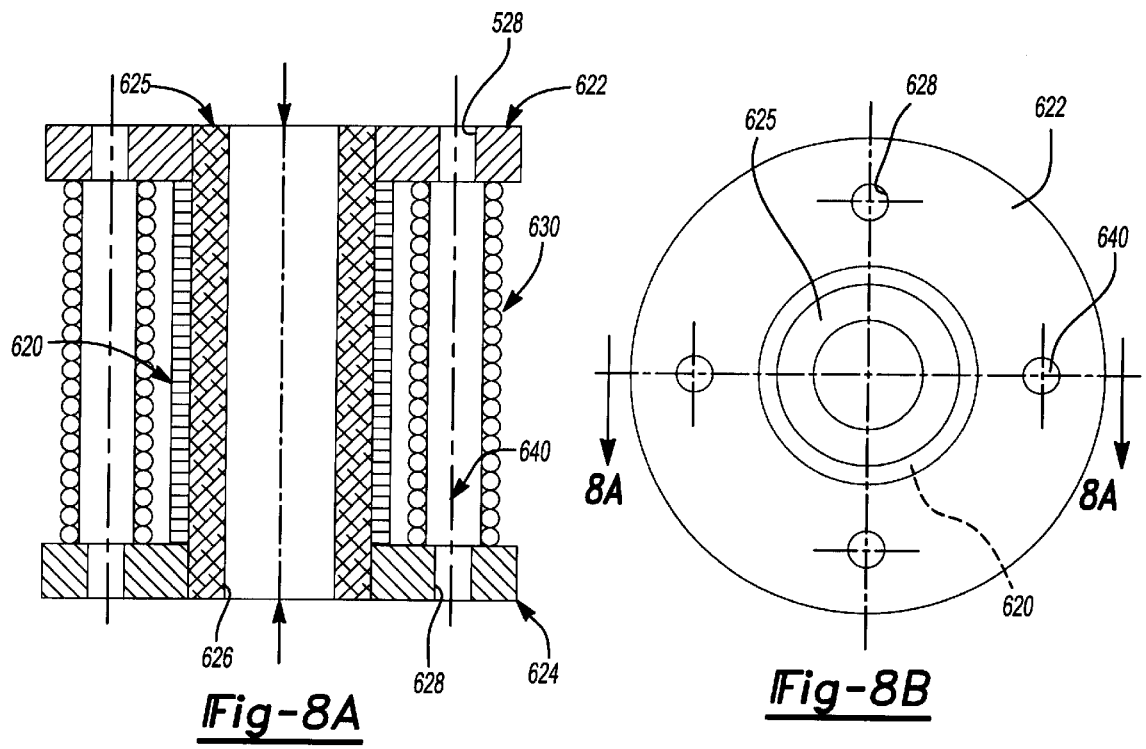
Fig-8A
Fig-8B
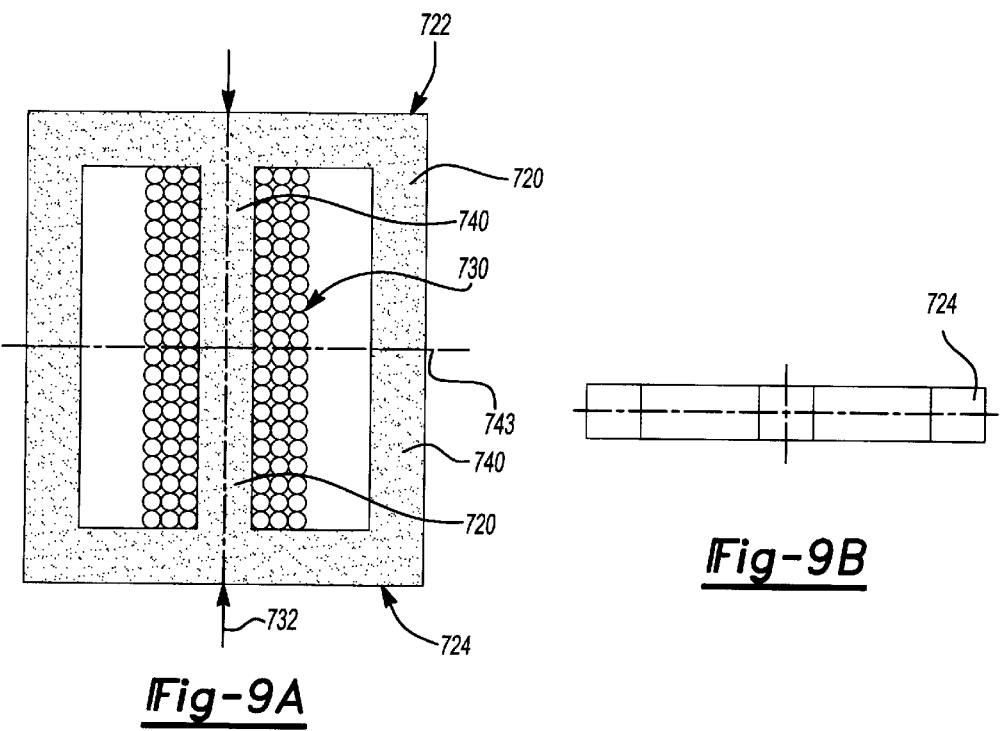
Fig-9A
Fig-9B

SINGLE COIL MAGNETOSTRICTIVE SENSORS

REFERENCE TO RELATED APPLICATION

This application is based on provisional application No. 60/061,292, filed Oct. 7, 1997.

BACKGROUND OF THE INVENTION

The field of the invention pertains to sensors wherein changes in the physical size of a magnetic circuit are driven by or sensed by electric coils through which the magnetic circuit passes. Typically, such a device comprises an exciting coil and a sensing coil joined by a magnetic circuit of high permeability combined with physical stress/strain characteristics that measurably affect the physical dimensions of the magnetic circuit and the magnetic permeability.

Magnetostrictive sensor structures are disclosed in applicant's previous U.S. Pat. No. 5,437,197 wherein an magnetic circuit passes through two coils. One coil excites the magnetic circuit by means of an alternating electric current and the second coil senses changes in magnetic flux as changes in physical forces applied to the magnetically permeable circuit occur. In alternative embodiments dynamic sensors comprise a direct current applied to the exciting coil or the substitution of a permanent magnet for the exciting coil to produce a constant exciting flux in the magnetic circuit.

U.S. Pat. No. 5,297,439 discloses a sensor comprising a magnetostrictive material inductively coupled to a simple electric resonance circuit. Changes in strain of the magnetostrictive material cause changes in the resonance frequency of the electrical signal which, in turn are picked up by a nearby aerial and transmitter/receiver.

U.S. Pat. No. 4,955,241 discloses a magnetoelastic force measuring device comprising a soft magnetic measuring film in a configuration that provides good thermal error compensation. In another manner U.S. Pat. No. 5,007,295 discloses a magnetoelastic force transducer configured to compensate for non-force induced changes in the magnetic permeability of the device. U.S. Pat. No. 4,823,621 discloses a magnetoelastic force transducer having similar compensation means as the two patents above but with an asymmetric center pole configured to compensate for any measurement signal arising under zero applied force on the device. U.S. Pat. Nos. 4,802,368 and 4,825,709 both disclose configurations to compensate for temperature changes and other non-force induced changes in the magnetic permeability of a thin walled component of the magnetic circuit.

Also, of background interest are three papers co-authored by applicant and published by the American Institute of Physics. A Noncontacting Magnetostrictive Strain Sensor, Darrell K. Kleinke and H. Mehmet Uras, Rev. Sci. Instrument 64(8), August 1993, discloses a sensor wherein the portion of the magnetic circuit subject to strain is separated from the rest of the magnetic circuit by air gaps.

A magnetostrictive Force Sensor, Darrell K. Kleinke and H. Mehmet Uras, Rev. Sci. Instrument 65(5), May 1994, discloses a sensor wherein the cores of the exciting coil and sensing coil are the principal magnetostrictive elements of the permeable circuit. Modelling of Magnetostrictive Sensors, Darrell K. Kleinke and H. Mehmet Uras, Rev. Sci. Instrument 67(1), January 1996, discusses the mathematical modelling of the sensors disclosed in the above two papers.

With a view toward simplifying the above sensors and, therefore, providing more economically constructed sensors for mass production and installation, the applicant has developed the following improved sensors.

SUMMARY OF THE INVENTION

The invention comprises a magnetostrictive force or strain sensor having one electric coil to both excite the magnetostrictive circuit and detect changes in the permeability of the circuit arising from forces applied to the circuit or induced to strain a portion of the circuit. The new sensor may be constructed to sense either or both compressive and tensile forces applied to the magnetostrictive circuit. Thin foils or plating applied to non-magnetically permeable materials may comprise part or all of the magnetostrictive circuit to provide an exceptionally inexpensive and light weight structure for the sensor. A permanent magnet may be incorporated into the structure to provide a sensor capable of measuring dynamic forces, especially those of impact, explosion and relatively high frequency.

The new sensors have a wide range of applications including but not limited to occupant sensing and weighing in automobile airbag systems, engine, powertrain and suspension controls, and monitoring highway bridge loads.

BRIEF DESCRIPTION OF THE DRAWINGS

FIG. 5 is a side cross-sectional view of the new sensor with a double layer core inside the coil;

FIG. 6 is a side view of a simple adjustable adapter to measure tensile forces with the new sensor;

FIG. 7A is a side cross-sectional view of the new sensor with multiple coils arranged for series electrical connection in a compact configuration;

FIG. 7B is a top view of the sensor of FIG. 7A;

FIG. 8A is a side cross-sectional view of the new sensor of FIG. 7 with a central load carrying member added;

FIG. 8B is a top view of the sensor of FIG. 8A;

FIG. 9A is a side view of the new sensor comprising a pair of E-cores in facing arrangement;

FIG. 9B is a bottom view of the new sensor of FIG. 9A;

DESCRIPTION OF THE PREFERRED EMBODIMENTS

Figure 1:
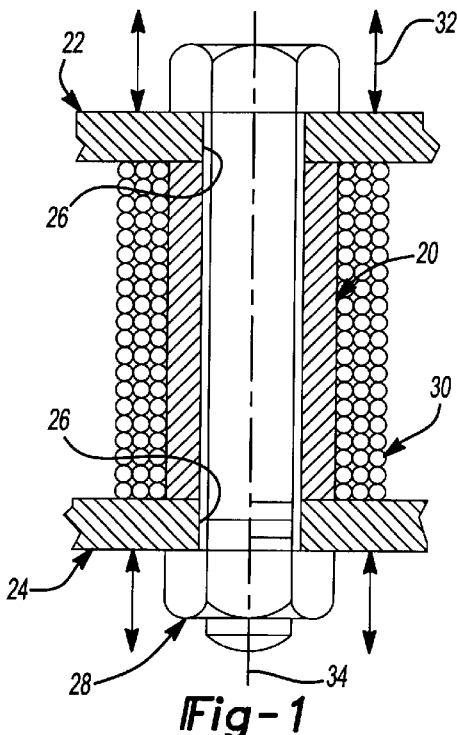
FIG. 1 is a side cross-sectional view of the new sensor in simplest form.

FIG. 1 illustrates in simplest configuration the new sensor comprising a hollow tubular member 20 and upper 22 and lower 24 face plates. Passing through apertures 26 in the face plates 22 and 24 and the center of member 20 is a bolt and nut assembly 28 which retains the sensor assembly mechanically together.

Wound about the member 20 is a coil 30 to which is applied an alternating current (AC) to excite the coil and thereby create a magnetic flux about the coil. The upper 22 and lower 24 face plates are constructed of ferromagnetic material which may be magnetostrictive. The hollow tubular member 20 is of a ferromagnetic material such as ferrite and acts as the compression/extension member when forces are applied externally to the sensor.

In response to the external forces shown by arrows 32, which may be tensile if the sensor is preloaded by tightening the bolt and nut assembly 28, the reluctance of the hollow tubular member 20 changes. Thus, by either holding the AC electric current constant a change in AC voltage results from the change in reluctance or by holding the AC electric voltage constant a change in AC current results from the change in reluctance. The change in strain due to external force 32 in the magnetostrictive material of the member 20 causes a change in reluctance which can be easily measured as the change in AC current or AC voltage in the same coil as that excited.

Figure 1A:
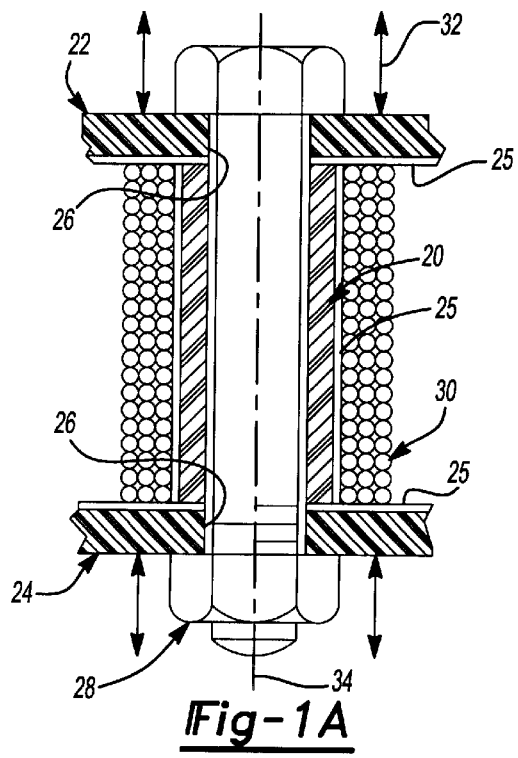
FIG. 1A is a side cross-sectional view of a modification of the new sensor of FIG. 1.

As shown in FIG. 1A, the upper 22 and lower 24 face plates and the hollow tubular member 20 may be substantially constructed of a non-magnetically permeable substrate material such as a plastic. Onto the non-magnetically permeable material is plated or otherwise formed a magnetostrictive film or coating 25 which changes in reluctance in response to strain of the film coincident with strain of the substrate.

Although shown in FIG. 1 with a centerline or axis 34 implying a circular configuration in plan view, the hollow tubular member 20 may be square or rectangular in plan view with the coil 30 wrapped thereabout.

To measure dynamic forces the sensor may be constructed with a permanent magnet material comprising the hollow tubular member 20. Such a configuration provides a static magnetic flux through the magnetostrictive circuit and the coil 30. Dynamic forces resulting from impact, explosion or high frequency applications can be measured without pre-excitation of the coil 30 with an AC current.

Figure 2:
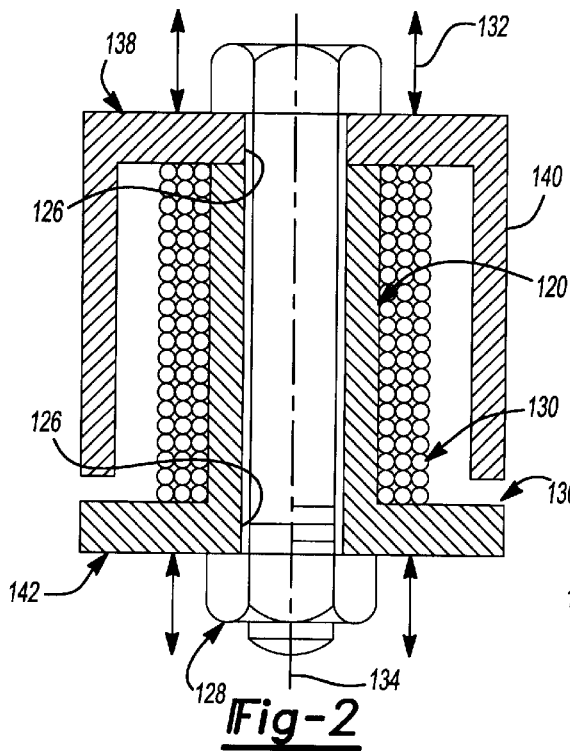
FIG. 2 is a side cross-sectional view of the new sensor with an air gap in the magnetostrictive circuit.

FIG. 2 illustrates a sensor similar to the sensor of FIG. 1, but modified to provide a better flux path, shielding and an air gap 136 in the magnetostrictive circuit. The upper face plate 138 is extended down about the coil 130 in the manner of a cover 140 to form the air gap 136 with the lower face plate 142. The other elements of the sensor may be the same as in FIG. 1 and are numbered accordingly with the prefix "1".

As the hollow tubular portion 120 is strained by the applied force 132 the physical change in the air gap 136 between the cover 140 and lower face plate 142 together with reluctance change in 120 causes a significant change in the magnetic flux passing through the entire circuit of the face plates 138 and 142, hollow tubular portion 120 and cover portion 140. The change in the air gap 136 effectively acts as a magnetic amplifier within the sensor resulting in an amplified change in reluctance and in the electric detection signal.

Figure 2A:
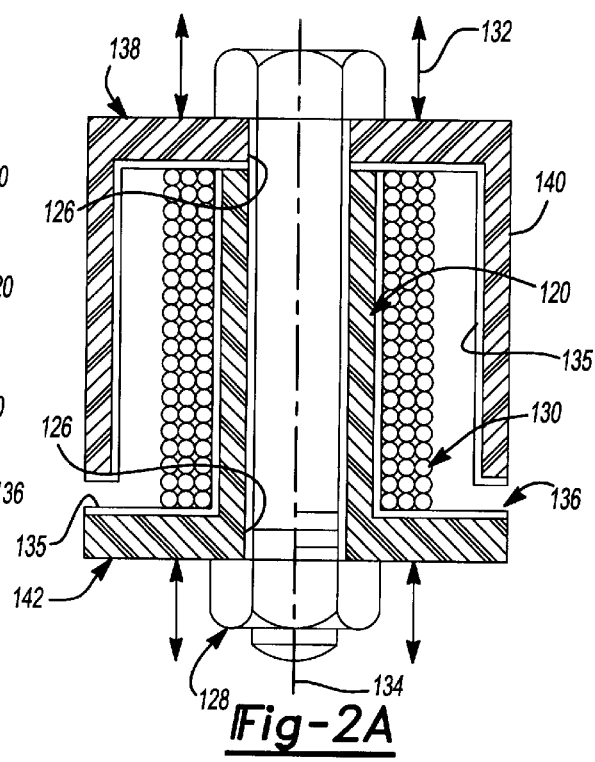
FIG. 2A is a side cross-sectional view of a modification of the new sensor of FIG. 2.

FIG. 2A illustrates the modification of the sensor of FIG. 2 with a magnetostrictive film 135 applied to the upper face plate 138 and cover 140, and separately to the lower face plate 142 and hollow tubular portion 120. Most importantly the plating extends into the gap 136.

As with the above described sensor the cross-section of the sensors in FIGS. 2 and 2A may be circular, square, rectangular or similar cross-section.

Figure 3:
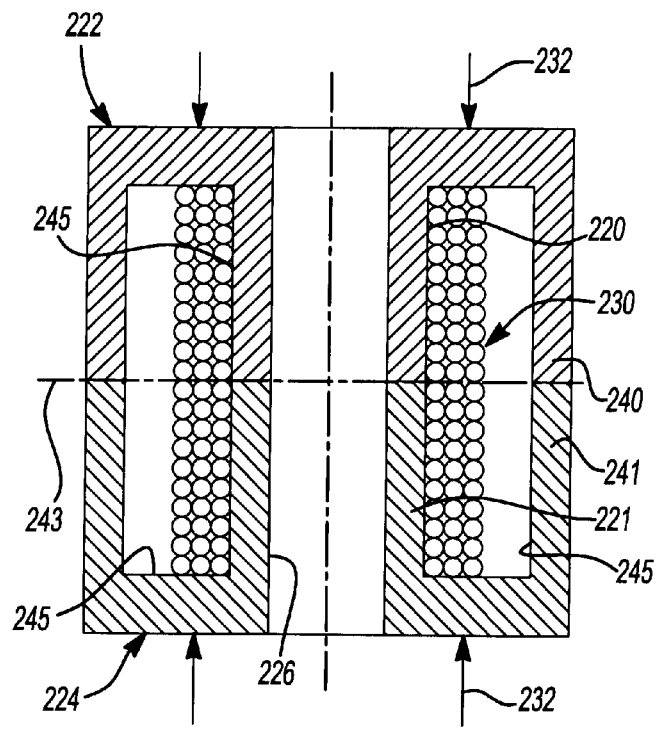
FIG. 3 is a side cross-sectional view of the new sensor with an enclosed coil.

FIG. 3 illustrates a sensor similar to the sensor of FIG. 1, but modified to completely enclose the coil 230 with the magnetostrictive circuit. The magnetostrictive circuit pieces may be constructed of a ferromagnetic material such as ferrite and comprise a pair of mirror image pieces joined along a central line 243. The mirror image pieces comprise an upper face plate 222 and lower face plate 224. Integral with the upper face plate 222 are an upper tubular portion 220 surrounding aperture 226 and upper outside cover 240. Likewise, integral with the lower face plate 224 are lower tubular portion 221 and lower outside cover 241.

As with the above described sensor the cross-section of the sensor in FIG. 3 may be circular, square, rectangular or another similar cross-section. The magnetostrictive circuit may comprise a plastic substrate with a magnetically permeable film applied to the interior or exterior surfaces of the sensor such as at 245. The forces 232 applied to the sensor for measurement may be compressive only or with precompression as noted above, tensile forces may also be measured.

Figure 4:
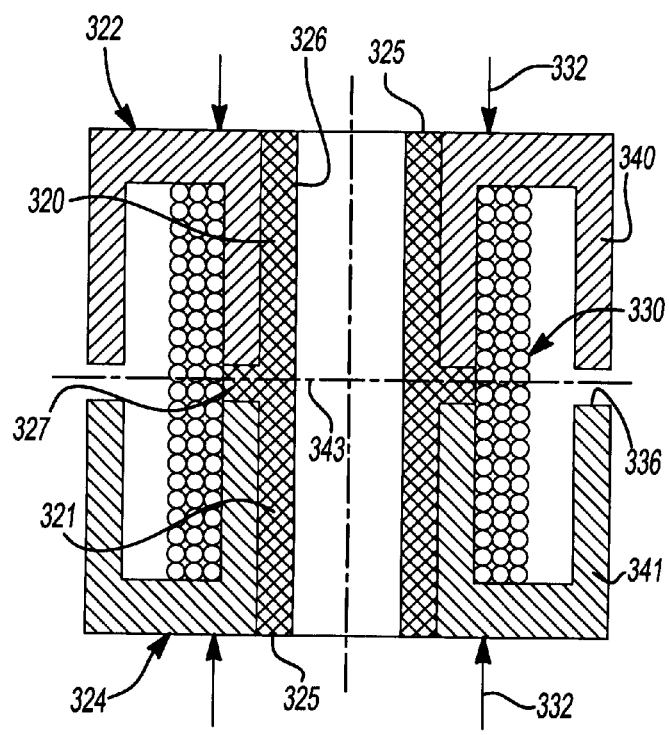
FIG. 4 is a side cross-sectional view of the new sensor with a center air gap, self-excitation and axial sleeve load carrying member.

In FIG. 4 the upper and lower mirror image pieces are separate to form an air gap 336 at the horizontal central line 343. A load carrying sleeve 325 surrounds the central aperture 326. An integral external flange 327 supports and separates the upper tubular portion 320 and the lower tubular portion 321 to form the air gap 336.

For dynamic force measurements the sleeve 325 may be formed from a permanent magnet material as above. Or, as noted above the upper and lower pieces comprising the upper and lower face plates 322 and 324, tubular portions 320 and 321 and covers 340 and 341 may be constructed with a plastic substrate and plated with the magnetostrictive material. The magnetostrictive material may also be applied to a sleeve 325 of plastic or other non-magnetically permeable material. The coil 330 is wound about the tubular portions 320 and 321.

As with the above sensors the horizontal cross-section may be circular or non-circular and with precompression of the sensor both compressive and tensile forces 332 may be applied to the sensor and measured.

FIG. 5 illustrates a modification of the sensor to separate the load carrying members from the magnetostrictive circuit. The sleeve 425 and tubular member 420 extend axially beyond the upper face plate 422 and lower face plate 424. As above the exciting and detecting coil 430 is wound about the tubular member 420 and enclosed by a cover 440. The face plates 422 and 424, the tubular member 420 and the cover 440 all comprise ferromagnetic material such as ferrite or may be constructed of plastic and plated, coated or otherwise covered with ferromagnetic material as necessary to form the magnetostrictive circuit. The sleeve 425 may also form a part of the magnetostrictive circuit or merely be a load carrying member along with the tubular member 420. With this construction the face plates 422 and 424 and the cover 440 may be much lighter in construction. For measurement of dynamic forces either the sleeve 425 or the tubular member 420 may be constructed of a permanent magnet material. And, the sensor may be precompressed to permit measurement of both tensile and compressive forces 432.

In FIG. 6 a simple device is shown for precompressing any of the sensors shown in FIGS. 1 through 5. The device comprises a pair of complementary eye bolts 450 and 452 having a threaded engagement therebetween 454. Each eyebolt 450 and 452 includes a flange 456. With the threaded engagement 454 positioned within central aperture 26 of any of the above sensors, precompression can be applied to the sensor by tightening the threaded engagement and tensile forces subsequently applied through attachments to the eyes of the eyebolts 450 and 452. Depending on the application the device of FIG. 6 may be constructed of ferromagnetic material or non-ferromagnetic material.

Illustrated in FIGS. 7A and 7B is a modification of the sensor for applications where the axial dimension is limited. Ferromagnetic face plates 522 and 524 are spaced apart and retained by three or more (4 as shown) ferromagnetic pins 540 to comprise the magnetostrictive circuit. The pins 540 are shouldered at each end and press fit or otherwise attached in holes 528 in the face plates 522 and 524.

Although shown round, the face plates 522 and 524 may be triangular, cruciform or of other geometric shape. Each pin 540 has wound thereabout a coil 530. The coils 530 are electrically connected in series and may be multiple layer wound on each pin 540. Using a device such as shown in FIG. 6 the sensor of FIGS. 7A and 7B may be precompressed and used for tensile force measurements.

As above parts of the magnetic circuit may incorporate a permanent magnet material for dynamic force measurements or a plastic material with a ferromagnetic film applied thereto. With this configuration a relatively large coil 530 can be accommodated in a limited axial space.

FIGS. 8A and 8B illustrate a modification of FIGS. 7A and 7B wherein a sleeve 625 and center tubular member 620 are added to provide a load carrying member and magnetostrictive member respectively between the upper 622 and lower 624 face plates. The sleeve 625 and tubular ember 620 surround the central aperture 626. Outside of the tubular member 620 are free or more pins 640 (4 pins shown) each wound with a coil 630. The coils 630 are electrically connected in series making this sensor configuration also useful where axial space is limited. The pins 640 are press fit or otherwise attached to the upper 622 and lower 624 face plates in holes 628.

As above all of the components except the coils 630 may be made of ferromagnetic materials or ferromagnetic materials formed on the surfaces of non-permeable materials. The sleeve 625 and tubular member 620 may be constructed of permanent magnet material to sense dynamic loading. And, by precompression tensile as well as compressive forces 632 may be measured.

Illustrated in FIGS. 9A and 9B is a substantially planar form of the sensor. E-cores 722 and 724 symmetric about a center plane 743 comprise a center piece 720 and side pieces 740 above and below the center plane. Wrapped about the center piece 720 is the coil 730. The E-cores may be constructed of ferromagnetic material, permanent magnet material for dynamic force measurements or magnetostrictive film material on a non-magnetic substrate. The force 732 to be measured is applied in the plane of the sensor as shown.

Figure 10A:
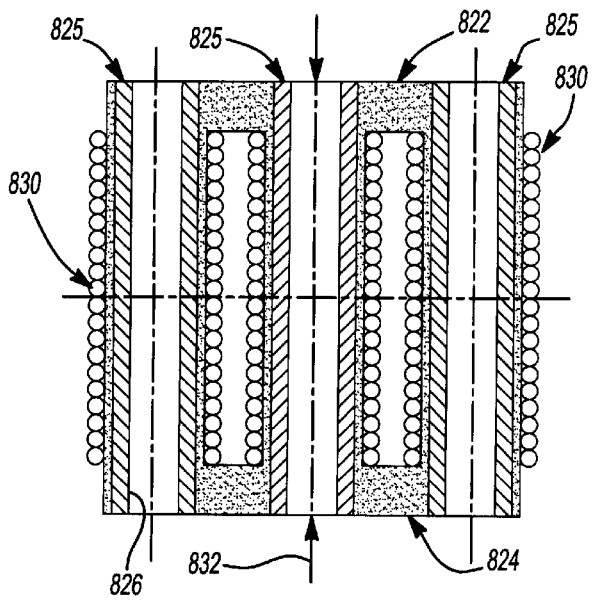
FIG. 10A is a side cross-sectional view of the new sensor of FIG. 9 including load carrying members inside the coils.
Figure 10B:
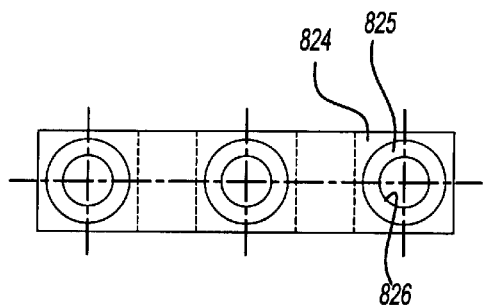
FIG. 10B is a bottom view of the new sensor of FIG. 10A.

In FIGS. 10A and 10B the sensor of FIGS. 9A and 9B is further modified by parallel apertures 826 surrounded by load carrying sleeves 825 in the E-cores 822 and 824. The apertures 826 permit eyebolt devices similar to FIG. 6 to apply precompression and permit tensile forces and compressive forces 832 to be conveniently measured. Coils 830 are wrapped about all three sleeves 825 and apertures 826 and connected electrically in series.

Figure 11A:
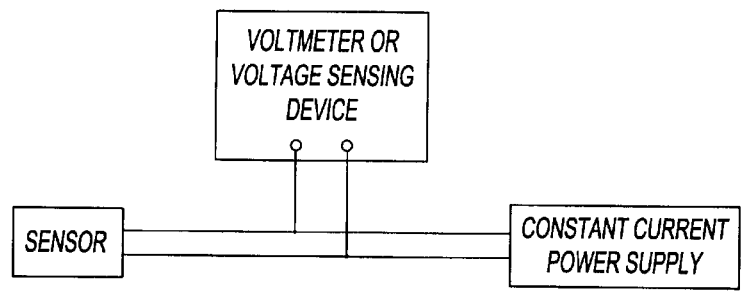
FIG. 11A illustrates in block diagram a constant current and voltage change sensing circuit for the new sensor.
Figure 11B:
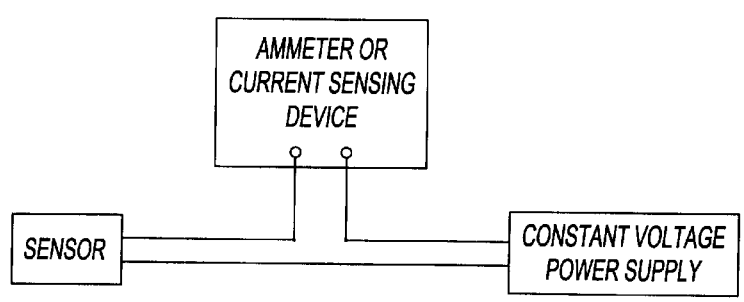
FIG. 11B illustrates in block diagram a constant voltage and current change sensing circuit for the new sensor.

The block diagrams of FIGS. 11A and 11B illustrate the sensor is electrically connected to a source of well regulated constant current or constant voltage. By measuring changes in the voltage or current respectively the changes in magnetic permeability arising from strain of the magnetostrictive components under load can be measured and continuously monitored in real time.

Having described my invention, many modifications thereto will become apparent to those skilled in the art to which it pertains without deviation from the spirit of the invention as defined in the appended claims.

What is claimed is:

1. A magnetostrictive force sensor comprising:
   a magnetically permeable structure having an air gap, the magnetically permeable structure forming at least part of a magnetic circuit;
   a sensor means for concurrently inducing a magnetic field in the magnetic circuit and for sensing changes in the magnetic field, the sensor means operatively attached to the structure; and
   wherein externally induced strain in the structure changes the magnetic permeability of at least one element of the structure, thereby inducing a change in the magnetic field, the sensor sensing the change in the magnetic field.

2. The magnetostrictive force sensor of claim 1 wherein the common excitation and detection element comprises a single electric coil.

3. The magnetostrictive force sensor of claim 1 further including a permanent magnet attached to the magnetically permeable structure for inducing a magnet field.

4. The magnetostrictive force sensor of claim 1 wherein the air gap in the circuit acts as an amplifier to increase an output of the sensor.

5. The magnetostrictive force sensor of claim 1 wherein the air gap in the magnetic circuit compensates for temperature changes and other undesirable effects.

6. The magnetostrictive force sensor of claim 1 further including at least one of a magnetostrictive foil, paint and coating in the air gap.

7. The magnetostrictive force sensor of claim 1 further including means for preloading the magnetostrictive force sensor.

8. The magnetostrictive force sensor of claim 1 wherein the magnetostrictive force sensor is electrically connected to a source of constant current, whereby changes in voltage are measured and correlated to changes in the magnetic field arising from strain of the structure under load, the changes in the magnetic field being measured and monitored in real time.

9. A magnetostrictive force sensor comprising:
   a magnetically permeable structure forming at least part of a magnetic circuit;
   a sensor means for concurrently inducing a magnetic field in the magnetic circuit and for sensing changes in the magnetic field, the sensor means operatively attached to the structure, the sensor including at least one of a thin magnetostrictive foil, paint and coating applied to at least one element of the structure; and
   wherein externally induced strain in the structure changes the magnetic permeability of at least one element of the structure, thereby inducing a change in the magnetic field, the sensor sensing the change in the magnetic field.

10. The magnetostrictive force sensor of claim 9 further including means for preloading the magnetostrictive force sensor.

11. The magnetostrictive force sensor of claim 9 wherein the magnetostrictive force sensor is electrically connected to a source of constant current, whereby changes in voltage are measured and correlated to changes in the magnetic field arising from strain of the structure under load, the changes in the magnetic field being measured and monitored in real time.

12. A magnetostrictive force sensor comprising:
a magnetically permeable structure forming at least part of a magnetic circuit, the structure including an aperture therethrough and a sleeve disposable within the aperture;
a sensor means for concurrently inducing a magnetic field in the magnetic circuit and for sensing changes in the magnetic field, the sensor means operatively attached to the structure; and
wherein externally induced strain in the structure changes the magnetic permeability of at least one element of the structure, thereby inducing a change in the magnetic field, the sensor sensing the change in the magnetic field.

13. The magnetostrictive force sensor of claim 12 further comprising a bolt and nut receivable through the aperture.

14. The magnetostrictive force sensor of claim 12 further comprising a bolt and nut receivable through the sleeve.

15. The magnetostrictive force sensor of claim 12 wherein the magnetically permeable structure includes at least one load carrying sleeve.

16. The magnetostrictive force sensor of claim 15 further comprising an integral external flange on the at least one sleeve, at least one sleeve forming at least one air gap.

17. The magnetostrictive sensor of claim 12, wherein the sensor includes an electric coil in proximity to the structure.

18. The magnetostrictive sensor of claim 12, wherein the structure includes at least one pin disposed between a first plate and a second plate.

19. The magnetostrictive sensor of claim 18, wherein the sensor is disposed about the at least one pin.

20. The magnetostrictive sensor of claim 18, wherein the first and second plates each include a centrally disposed aperture.

21. The magnetostrictive force sensor of claim 12 wherein the magnetostrictive force sensor is electrically connected to a source of constant current, whereby changes in voltage are measured and correlated to changes in the magnetic field arising from strain of the structure under load, the changes in the magnetic field being measured and monitored in real time.

22. A magnetostrictive force sensor comprising:
a magnetically permeable structure forming at least part of a magnetic circuit;
a sensor means for concurrently inducing a magnetic field in the magnetic circuit and for sensing changes in the magnetic field, the sensor means operatively attached to the structure;
wherein externally induced strain in the structure changes the magnetic permeability of at least one element of the structure, thereby inducing a change in the magnetic field, the sensor sensing the change in the magnetic field; and
wherein the magnetostrictive force sensor is electrically connected to a source of constant voltage, whereby changes in current are measured and correlated to changes in the magnetic field arising from strain of the at least one structural element under load, the changes in the magnetic field being measured and monitored in real time.

23. A magnetostrictive force sensor comprising:
a magnetically permeable structure having a magnetically permeable member for forming a magnetic circuit; and
a sensor for concurrently inducing a magnetic field and for sensing changes in the magnetic field, the sensor magnetically interacting with the structure the sensor includes a plurality of electric coils in series connection with one another and in proximity to the structure; and
wherein subjecting the structure to a load induces a change in the magnetic permeability of the structure thereby inducing a change in the magnetic field, the sensor sensing the change in the magnetic field and producing an output signal in response.

24. The magnetostrictive sensor of claim 23, wherein the sensor includes a plurality of electric coils in series connection with one another, whereby each electric coil is disposed about one of the plurality of pillars.

25. The magnetostrictive sensor of claim 23, wherein the structure includes at least one pin disposed between first and second plates.

26. The magnetostrictive sensor of claim 23, wherein the sensor is disposed about the at least one pin.

27. The magnetostrictive sensor of claim 23, wherein the first and second plates each include a centrally disposed aperture.

28. The magnetostrictive sensor of claim 24, wherein the sensor is disposed about one of the plurality of pillars.

29. A magnetostrictive force sensor comprising:
a magnetically permeable structure having a magnetically permeable member for forming a magnetic circuit the structure includes first and second E-shaped halves that interconnect to form a plurality of pillars, each of the plurality of pillars includes an aperture extending therethrough, each of the apertures having a sleeve received therein; and
a sensor for concurrently inducing a magnetic field and for sensing changes in the magnetic field, the sensor magnetically interacting with the structure; and
wherein subjecting the structure to a load induces a change in the magnetic permeability of the structure thereby inducing a change in the magnetic field, the sensor sensing the change in the magnetic field and producing an output signal in response.

30. A magnetostrictive force sensor comprising:
a magnetically permeable structure having a magnetically permeable member for forming a magnetic circuit;
a sensor for concurrently inducing a magnetic field and for sensing changes in the magnetic field, the sensor magnetically interacting with the structure, the magnetostrictive force sensor is electrically connected to a source of constant voltage, whereby changes in current are measured and correlated to changes in the magnet field arising from strain a of the structure under load, the changes in the magnetic field being measured and monitored in real time; and
wherein subjecting the structure to a load induces a change in the magnetic permeability of the structure thereby inducing a change in the magnetic field, the sensor sensing the change in the magnetic field and producing an output signal in response.

* * * * *